(12) United States Patent
Reynolds (10) Patent No.: US 6,817,011 B1
(45) Date of Patent: Nov. 9, 2004

(54) MEMORY ALLOCATION PROFILING TO DISCOVER HIGH FREQUENCY ALLOCATORS

(75) Inventor: William Robert Reynolds, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/460,846

(22) Filed: Dec. 14, 1999

(51) Int. Cl.$^7$ .................................................. G06F 9/44
(52) U.S. Cl. ....................... 717/130; 717/127; 717/158
(58) Field of Search ............................... 717/127, 128, 717/130, 158; 714/38–39

(56) References Cited

U.S. PATENT DOCUMENTS

| | | |
|---|---|---|
| 5,355,457 A | 10/1994 | Shebanow et al. |
| 5,355,487 A | 10/1994 | Keller et al. |
| 5,408,650 A | 4/1995 | Arsenault |
| 5,491,808 A | 2/1996 | Geist, Jr. |
| 5,613,063 A | 3/1997 | Eustace et al. |
| 5,748,878 A | 5/1998 | Rees et al. |
| 5,784,554 A * | 7/1998 | Hsiung .......................... 714/45 |
| 5,835,701 A | 11/1998 | Hastings |
| 5,835,702 A * | 11/1998 | Levine et al. .................. 714/39 |
| 5,896,538 A | 4/1999 | Blandy et al. |
| 5,991,708 A * | 11/1999 | Levine et al. ................ 702/186 |
| 5,995,754 A * | 11/1999 | Holzle et al. ................ 717/158 |
| 6,167,535 A * | 12/2000 | Foote et al. .................... 714/38 |
| 6,311,327 B1 * | 10/2001 | O'Brien et al. ............... 714/35 |
| 6,349,406 B1 * | 2/2002 | Levine et al. ................ 702/179 |
| 6,457,142 B1 * | 9/2002 | Klemm et al. ................. 714/38 |

OTHER PUBLICATIONS

Y. Liao et al., "A Specificational Approach to High Level Program Monitoring and Measuring", IEEE Transactions on Software Engineering vol. 18 No. 11, Nov. 1992. pp. 969–978.*

Zorn et al., "A Memory Allocation Profiler for C and Lisp Programs", 1988, pp. 1–15.*

Lee et al., "BIT: A Tool for Instrumenting Java Bytecodes", USENIX Association, 1997. pp. 1–10.*

(List continued on next page.)

*Primary Examiner*—Kakali Chaki
*Assistant Examiner*—William H. Wood
(74) *Attorney, Agent, or Firm*—Joseph P. Lally; Leslie A. Van Leeuwen (57) ABSTRACT

A method, system, and computer program product for profiling memory allocation in a data processing system are disclosed. The method includes initiating a memory allocation request and, in response to the memory allocation request, profiling the memory allocation request to determine a prescribed set of characteristics associated with request. The profiled set of characteristics are the stored for subsequent review. In one embodiment, the profiled memory allocation request is selectively chosen from a set of memory allocation requests on the basis of a memory allocation sampling criterion. The sampling criterion may be based upon the size of the memory block requested in the memory allocation request in one embodiment. In an alternative embodiment, the sampling criterion is the based upon the number of memory allocation requests. In an embodiment with multiple memory allocation routines, the memory allocation request may be of a first memory allocation routine type and the sampling criterion may be based upon the number of memory allocation requests of the first type. In one embodiment, the set of characteristics monitored by the application program includes the calling sequence that resulted in the memory allocation request. In one embodiment, the memory allocation request may be initiated by an application program written in the Java programming language and the memory allocation request is handled by a Java Virtual Machine.

17 Claims, 4 Drawing Sheets

OTHER PUBLICATIONS

Ball et al., "Rewriting Executable Files to Measure Program Behavior", University of Wisconsin Computer Sciences Technical Report 1083, 1992. pp. 1–17.*

Cooper et al., "ProfBuilder: A Package for Rapidly Building Java Execution Profilers", University of Colorado at Boulder, Technical Report CU–CS–853–98, 1998. pp. 1–23.*

Detlefs et al., "Memory Allocation Costs in Large C and C++ Programs", University of Colorado at Boulder, Technical Report CU–CS–665–93, 1993. pp. 1–10.*

Graham et al., "gprof: a Call Graph Execution Profiler", Computer Science Division Electrical Engineering and Computer Science Department University of California, Berkeley, pp. 1–9.*

Ammons et al., "Exploiting Hardware Performance Counters with Flow and Context Sensitive Profiling", Wright Laboratory Avionics Directorate.*

Liang et al., "Comprehensive Profiling Support in the Java Virtual Machine", Sun Microsystems Inc.*

Profiling Technique for Memory References Within Individual Pages On Paging–Based Virtual Memory Systems; IBM Technical Disclosure Bulletin; ; Aug. 1992; pp. 320–325; vol. 35; No. 3.

Memory Utilization Monitor; IBM Technical Disclosure Bulletin; Oct. 1972; pp. 1709–1712; vol. 15; No. 5.

* cited by examiner

MEMORY ALLOCATION PROFILING TO DISCOVER HIGH FREQUENCY ALLOCATORS

BACKGROUND

1. Field of the Present Invention

The present invention is related to the field of computer software and more particularly to a method and system for monitoring memory allocation in a computer system.

2. History of Related Art

In the field of computer software, execution profiling tools are commonly used to identify frequently executed code and calling sequences. By monitoring these events, system programmers can focus their attention on the code paths likely to have the greatest impact on overall performance. Typically, these tools are implemented with time based sampling techniques in which the currently executing code is observed at regular intervals. Sampling is generally required because a complete trace of the execution of every bit of code in a program would reduce the performance beyond a feasible level and would result in an unwieldy amount of data. While, such tools are commonly available for the purposes of monitoring software execution, there is a lack of adequate tools for monitoring memory allocation performance. In high level applications programming languages like C/C++, memory management is handled by the programmer. When memory management is directly handled by the programmer, a tool designed to specifically track memory allocation might be considered as less than critical. In other programming languages, such as the Java programming language, the allocation of memory and, to an even greater extent, the deallocation of memory is largely beyond the programmer's control. In Java, allocation of memory is achieved by the creation of new objects. (Even array types are treated as objects in the Java programming language). While delegating the allocation of memory to objects in the Java programming languages reduces premature deallocation of memory (corrupted pointers) and the incomplete deallocation (memory leaks), it does make it more difficult for the programmer to analyze any memory allocation problems that the system may produce. Even in languages like C++, the extensive use of pre-existing software libraries removes much of the memory allocation activity from the application programmer's direct control. It would therefore be desirable to implement a tool suitable for monitoring memory allocation performance of a computer system. It would be further desirable if the performance monitoring tool were capable of monitoring allocation of memory by a high level programming language such as the Java programming language. It would be further desirable if the implemented solution did not significantly increase the complexity of the software system.

SUMMARY OF THE INVENTION

The problem identified above is addressed, in large part, by a method, system, and computer program product for profiling memory allocation in a data processing system. The method includes, upon receiving a memory allocation request, profiling the memory allocation request to determine a prescribed set of characteristics associated with the request. The profiled set of characteristics is the stored for subsequent review. In one embodiment, the profiled memory allocation request is selectively chosen from a set of memory allocation requests on the basis of a memory allocation sampling criterion. The sampling criterion may be based upon the size of the memory block requested in the memory allocation request in one embodiment. In an alternative embodiment, the sampling criterion is the based upon the number of memory allocation requests. In an embodiment with multiple memory allocation routines, the memory allocation request may be of a first memory allocation routine type and the sampling criterion may be based upon the number of memory allocation requests of the first type. In one embodiment, the set of characteristics monitored by the application program includes the calling sequence that resulted in the memory allocation request. In one embodiment, the memory allocation request may be initiated by an application program written in the Java programming language and the memory allocation request is handled by a Java Virtual Machine.

The invention further contemplates a data processing system and an associated computer program product. The computer program product is a computer readable media including a set of instructions executable by a data processing system and suitable for profiling memory allocation requests. The set of recorded instructions includes sampling means for determining if a memory allocation request satisfies a profiling criterion and profiling means that are responsive to determining that the memory allocation request fulfills the profiling criterion. The profiling means is suitable for determining a set of characteristics associated with the memory allocation request. The set of instructions further includes means for storing the profiled set of characteristics for subsequent review. In one embodiment, the sampling means includes means for counting the number of memory allocation requests since a preceding memory allocation request was profiled and profiling the current memory allocation request if the number exceeds a specified threshold. In an alternative embodiment, the sampling means comprise means for determining the size of memory requested in the memory allocation request and profiling the memory request if the size exceeds a specified threshold. In another embodiment, the sampling means comprise means for determining the cumulative size of memory allocated since the profiling means was previously invoked. The profiling means includes means for determining the process, thread, and calling sequence that initiated the memory allocation request. In one embodiment, the profiling means are included in a memory allocation routine within a Java Virtual Machine.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
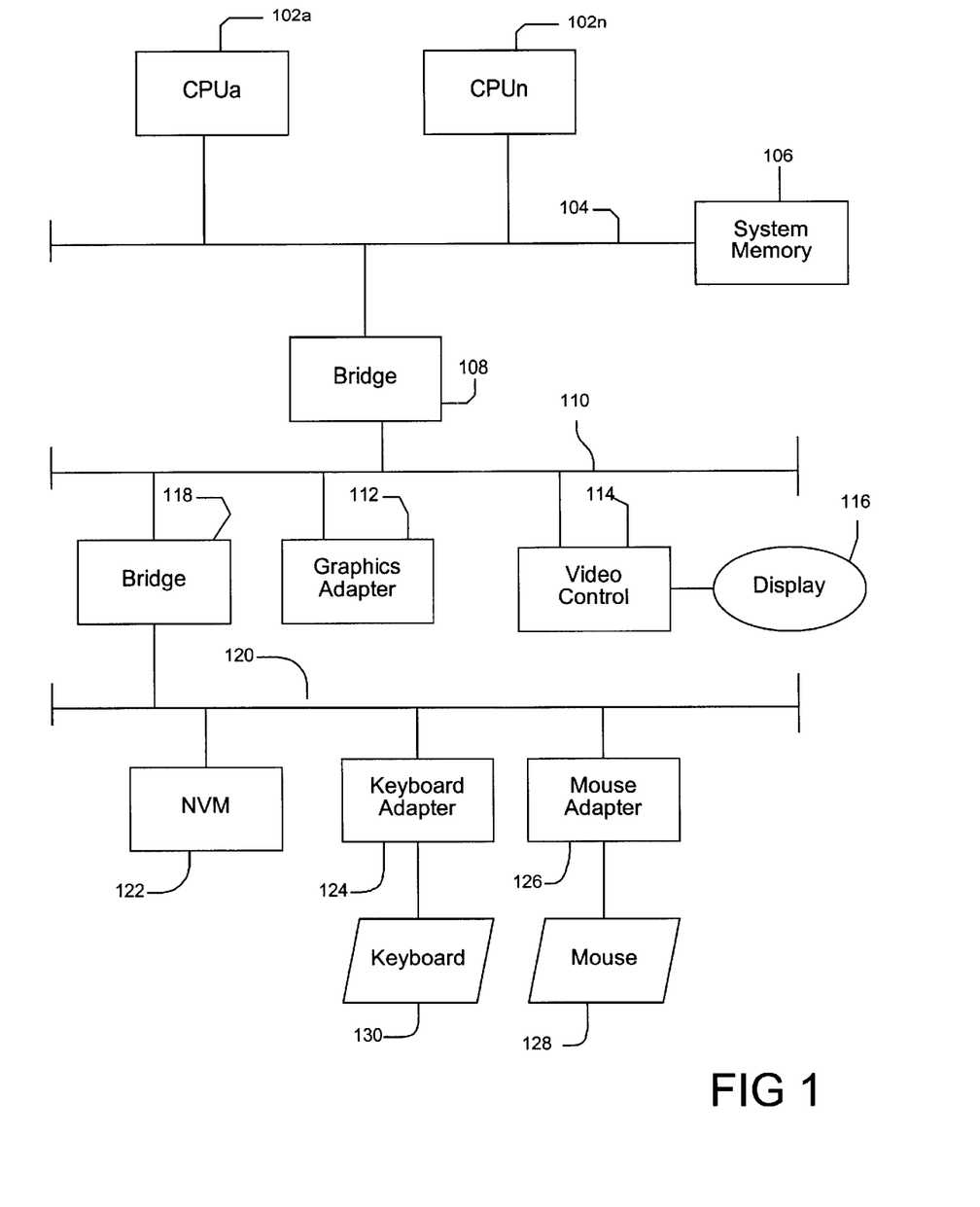
FIG. 1 is diagram of selected elements of a data processing system suitable for use with the present invention.

The methods and processes for monitoring memory allocation according to the various embodiments of the present invention may be implemented as a set of instructions recorded on a storage medium such as a system memory, hard disk, floppy disk, CD ROM, magnetic tape, or other appropriate storage device. The set of instructions are suitable for execution by a computer or data processing system or a network of such systems. Turning now to FIG. 1, a block diagram of selected elements of a data processing system 100 suitable for use with the present invention is presented. The depicted embodiment of system 100 includes one or more processors 102a . . . 102n (generically or collectively referred to herein as processor(s) 102) coupled via a system bus 104. The processors 102 may comprise any of a variety of commercially distributed processors including, as examples, PowerPC® processors from IBM Corporation, x86 family processors from Intel Corporation, or 68000 family processors from Motorola. A system memory 106, typically implemented as an array of dynamic RAM's, is accessible to processors 102 via system bus 104. A first bridge 108 of system 100 provides an interface between system bus 104 and a first peripheral or I/O bus 110. A wide variety of I/O devices may be coupled to first I/O bus 110 including hard disk controllers, audio adapters, and high speed network controllers for embodiments in which system 100 comprises one of multiple interconnected systems in a computer network. First I/O bus 110 is preferably compliant with any of a variety of high performance industry standard I/O bus architectures including the PCI, MCA, AGP, or EISA bus architectures. In the implementation of system 100 shown in FIG. 1, a graphics adapter 112 and video controller 114 are coupled to first I/O bus 110. The depicted embodiment of FIG. 1, further includes a second bridge 118 that provides an interface between first I/O bus 110 and a second I/O bus 129 thereby providing a path between second I/O bus 120 and system bus 104. Second I/O bus 120 is preferably compliant with various industry standard bus architectures including the ISA and PCI bus architectures. In one configuration, first I/O bus 110 is a PCI bus while second bus 120 is an ISA bus. In the depicted embodiment, a non-volatile memory device (NVM) 122 is coupled to second I/O bus 120. NVM 122 is preferably configured with a set of computer instructions executable by processors 102. NVM 122 is preferably implemented as a flash memory device desirable for its combination of non-volatility and programmability. In the preferred embodiment, the set of computer instructions contained in NVM 122 includes a boot code sequence suitable for transitioning computer system 100 from an idle state to a functional state following a system reset. The boot code sequence typically includes code suitable for loading the operating system software and may further includes the system's basic input/output system (BIOS). BIOS is utilized in conjunction with certain operating systems such as the Windows® operating system from Microsoft and the OS/2® operating system from IBM Corporation and includes low level microcode that controls the I/O device hardware such as the disk drives of system 100. Detailed BIOS information may be found in Croucher, *Que's BIOS Companion* (MacMillan 1998). Additional information regarding the OS/2 operating system is available in OS/2 *Version* 2.1 *Facts & Features* (Order No. G326-0169-04) from IBM Corporation. In alternative embodiments, system 100 may be implemented use in conjunction with non-BIOS based operating systems such as JavaOS and other suitable network based operating systems. Regardless of software implementation, system 100 further includes conventional input devices such as a keyboard 130 and mouse or other suitable pointing device 128 coupled to host bus 104 (via I/O busses 110 and 120) through keyboard adapter 124 and mouse adapter 126 respectively.

Figure 2:
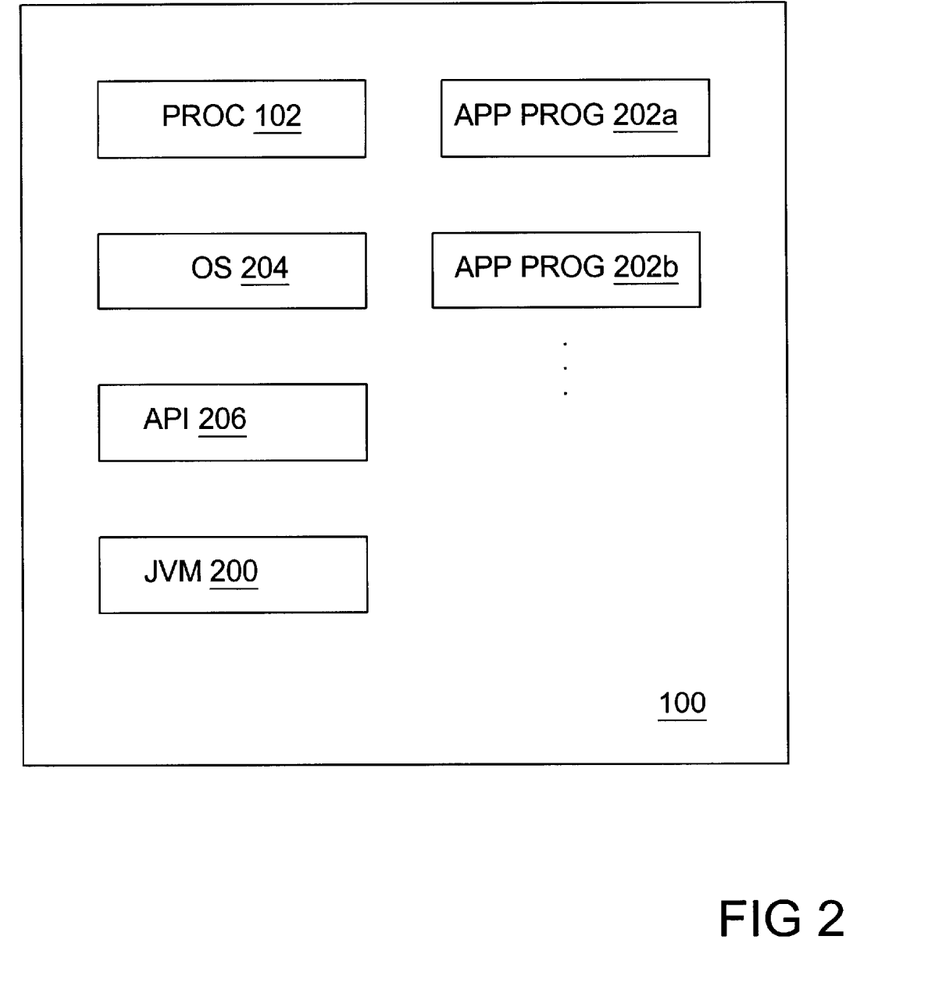
FIG. 2 is a block diagram of one embodiment of a data processing system suitable for use with the present invention.

Turning now to FIG. 2, a simplified block diagram of one embodiment of computer system 100 emphasizing the software architecture of system 100 is presented. In the depicted embodiment, system 100 includes the processor 102 discussed previously, as well as an operating system 204, an application programming interface (API) 206, and a Java virtual machine (JVM 200). In addition, system 100 includes one or more application programs 202a through 202n (generically or collectively referred to herein as application program(s) 202). In one embodiment, each application program 202 represents a Java application or Java applet. JVM 200 is an abstract computing machine that includes an instruction set and uses various memory areas. JVM 200 provides a Java platform that is capable of hosting an application on any computer or operating system without rewriting or recompiling. JVM 200 is also responsible for the compactness of applications 202, which are preferably written in the Java programming language, and is the basis for its security capabilities.

Figure 3A:
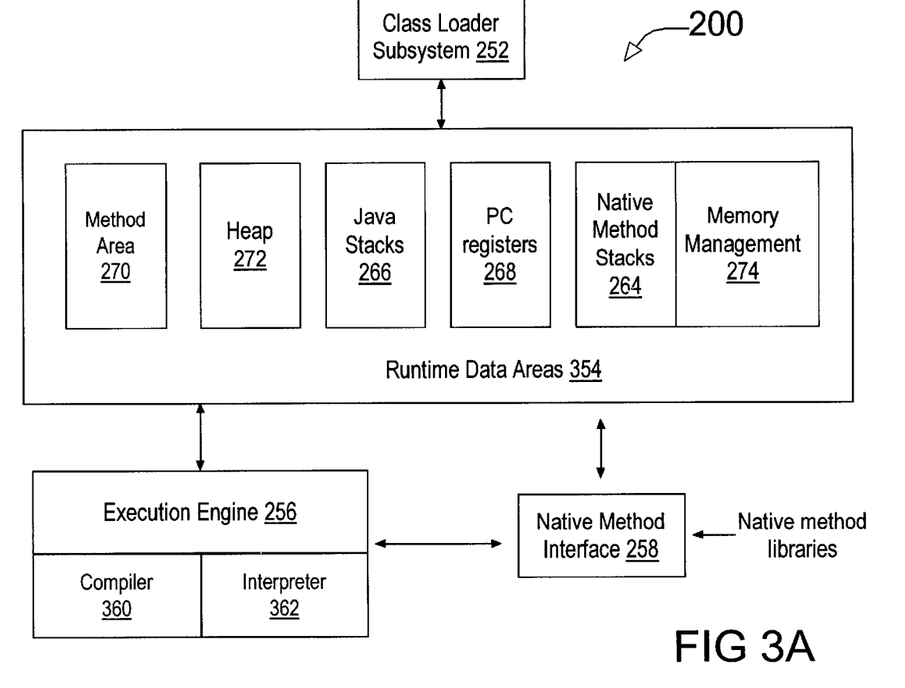
FIG. 3A is a diagram of a Java Virtual Machine according to one embodiment of the invention.

Turning now to FIG. 3A, a block diagram of JVM 200 according to one embodiment of the present invention is depicted. In the depicted embodiment, JVM 200 includes a class loader subsystem 252, which is a mechanism for loading types, such as classes and interfaces, given fully qualified names. JVM 200 also contains runtime data areas 254, execution engine 256, native method interface 258, and memory management unit 274. Execution engine 256 is a mechanism for executing instructions contained in the methods of classes loaded by class loader subsystem 252. Execution engine 256 may be, for example, Java interpreter 262 or just-in-time compiler 260. Native method interface 258 allows access to resources in the underlying operating system. Native method interface 258 may be, for example, a Java native interface.

Runtime data areas 254 contain native method stacks 264, Java stacks 266, PC registers 268, method area 270, and heap 272. These different data areas represent the organization of memory needed by JVM 200 to execute a program. Java stacks 266 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values. Java instructions that require or produce an intermediate value use the stack for holding the intermediate value. In this manner, the Java instruction set is well-defined for a variety of platform architectures.

Program counter (PC) registers 268 are used to indicate the next instruction to be executed. Each instantiated thread gets its own PC register and Java stack. If the thread is executing a JVM method, the value of the PC register indicates the next instruction to execute. If the thread is executing a native method, then the contents of the PC register are undefined. Native method stacks 264 store the state of invocations of native methods. The state of native method invocations is stored in an implementation-dependent way in native method stacks, registers, or other implementation-dependent memory areas. In some JVM implementations, native method stacks 264 and Java stacks 266 are combined. Method area 270 contains class data while heap 272 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 272. JVM 200 includes an instruction that allocates memory space within the memory for heap 272 but includes no instruction for freeing that space within the memory. Memory management unit 274 in the depicted example manages memory space within the memory allocated to heap 270. Memory management unit 274 may include a garbage collector which automatically reclaims memory used by objects that are no longer referenced. Additionally, a garbage collector also may move objects to reduce heap fragmentation. For additional information regarding Java and JVM 200, the reader is refrred to T. Lindholm and F. Yellin, *The Java Virtual Machine Specification Second Addition* (Addison-Wesley 1999) ISBN: 0-201-43294-3, which is incorporated by reference herein.

Figure 3B:
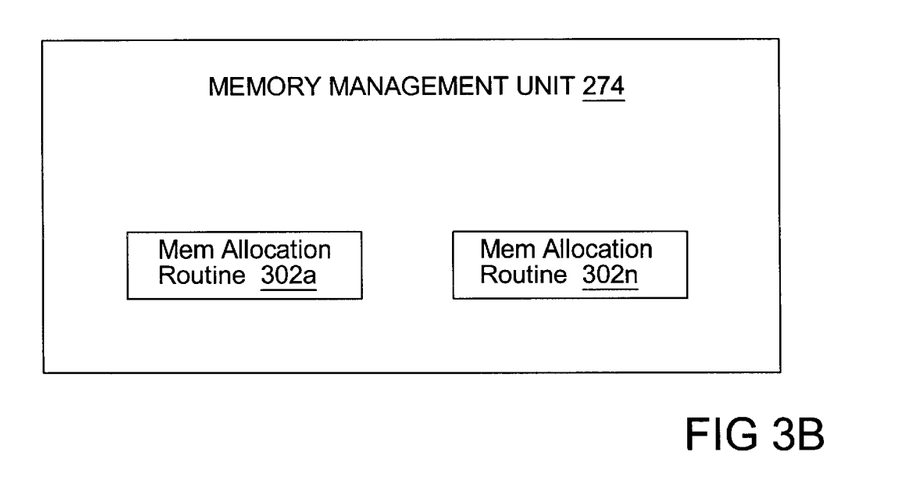
FIG. 3B illustrates the memory allocation routines of a memory management unit of the Java Virtual Machine of FIG. 3A.

Turning now to FIG. 3B, additional detail of memory management unit 274 is depicted. In the embodiment depicted in FIG. 3B, memory management unit 274 may include one or more memory allocation routines 302a through 302n (generically or collectively referred to herein as memory allocation routine(s) 302). When an application program 202 creates an object, JVM 200 invokes one or more of memory allocation routines 302 to allocate sufficient memory space for the newly created object. It will be appreciated by those familiar with Java in particular and high level programming languages in general that the number of memory allocation routines for a given software system is typically relatively small (i.e., less than 20). Each of the memory allocation routines 302 may be suited for responding to a specific type of object allocation request. As an example, a first memory allocation routine 302a may be suitable for allocating large objects while a second memory allocation routine 302b may be suitable for allocating memory for small objects. Alternatively, memory allocation routines 302 may be categorized based on the type of memory being allocated. Thus, for example, one memory allocation routine 302 may be responsible for allocating an array of primitives (i.e., integers, characters, doubles, etc.) while another memory allocation routine 302 may be responsible for allocating Java types such as vectors or display screens. Regardless of the manner in which memory allocation routines 302 are partitioned, the relatively small number of memory allocation routines 302 likely to exist on system 100 keeps the effort required to enable each routine 302 to monitor memory allocation activity, as described below, to a manageable level Turning now to FIG. 4, additional detail of a memory allocation routine 302 according to one embodiment of the present invention is presented. In the embodiment depicted in FIG. 4, memory allocation routine 302 is configured to receive a memory allocation request 402 from JVM 200 in response to a method or other procedure issued by an application program 202. In one embodiment, memory allocation routine 302 is instrumented with code suitable for monitoring memory allocation requests on a selective or sampled basis. In one embodiment, the instructions are sampled on the basis of the amount of memory requested, either on a cumulative basis or on a per request basis. In another embodiment, the sampling is based upon the number of memory allocation requests. To achieve these embodiments, the depicted embodiment of memory allocation routine 302 includes an allocation counter 404 and a block size counter 406 that are configured to receive the memory allocation request 402. Allocation counter 404 is adapted to count the number of times memory allocation routine 302 is invoked and to initiate a memory allocation profiling object 408 when the number of requests to memory allocation routine 302 that has transpired since the last invocation of memory allocation profiling object 408 exceeds a predetermined threshold. In the preferred embodiment, the threshold number of times that memory allocation routine 302 may be invoked prior to invoking memory allocation profiling object 402 is user programmable. In the depicted embodiment, memory allocation routine 302 is further configured to initiate memory profiling object 408 based upon the size of memory requested. In a "per allocation" variation of this embodiment, the block size counter 406 triggers, memory profiling object 408 if the size of the memory requested by memory allocation request 402 exceeds a block size threshold value, where the threshold value is preferably user programmable. In a "cumulative" variation of this embodiment, block size counter 406 triggers memory profiling object 408 if the accumulated size of memory allocated since a previous invocation of memory allocation profiler 408 exceeds the block size threshold value. (Other embodiments may include facilities for both per-request and cumulative block size sampling). In embodiments in which JVM 200 includes multiple memory allocation routines 302, each memory allocation routine 302 may be associated with its own corresponding threshold values. Thus, a first memory allocation routine 302a may initiate memory profiling object 408 every $5^{th}$ time memory allocation routine 302a is invoked while a second memory allocation routines 302 may initiate memory profiling object 408 every $12^{th}$ time memory allocation routine 302b is invoked. Alternatively, the threshold values that trigger memory profiling object 408 may be "global" values that are shared by all memory allocation routines 302. Similarly, although the depicted embodiment indicates memory allocation profiler 408 as a portion of memory allocation routine 302, other embodiments of system 100 may utilize a single memory allocation profiling object 408 that is shared by each of the memory allocation routines.

Figure 4:
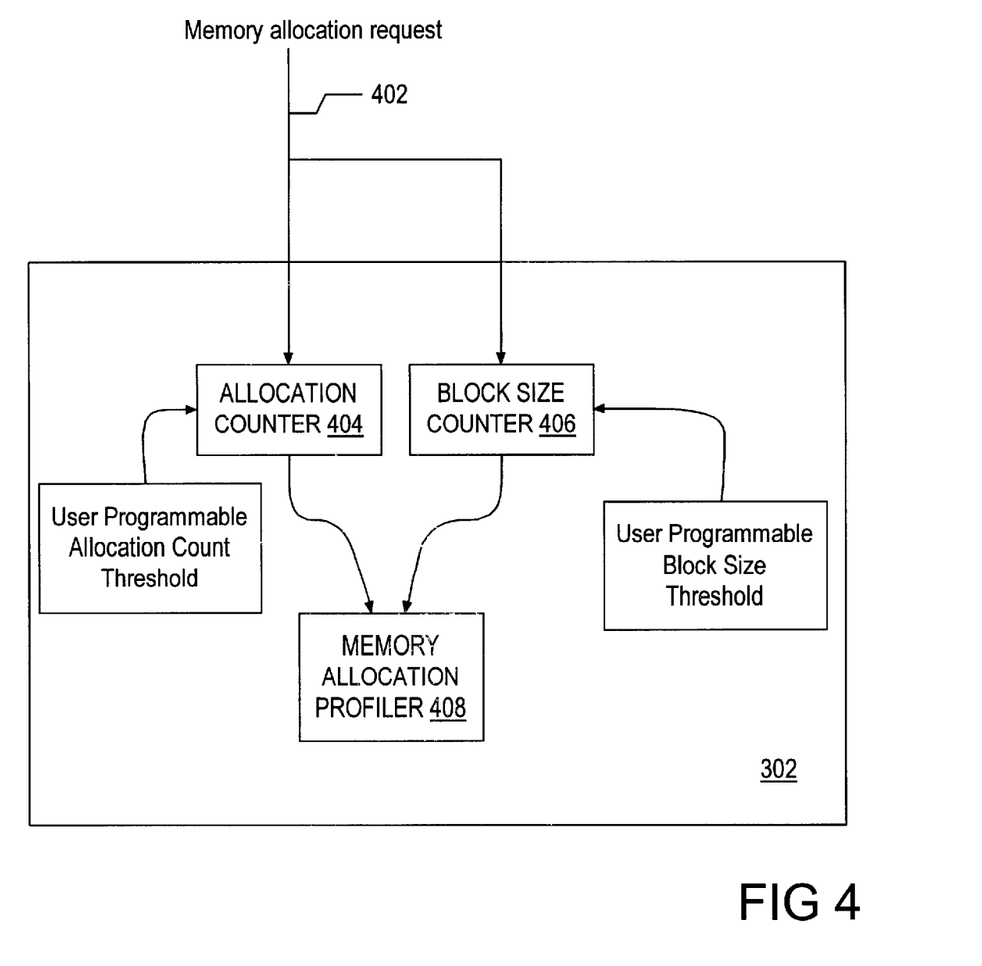
FIG. 4 is a diagram of a memory allocation profiling object according to one embodiment of the present invention.

In the preferred embodiment, a memory allocation routine 302 instrumented according to the present invention is configured to selectively monitor frequent or very large memory allocations and to determine and record a set of characteristics associated with each monitored allocation. In one embodiment, memory allocation profiling object 408 is configured to record information such as the executing process, the executing thread, and the previous instruction. The preferred embodiment of profiling object 408 is able to identify the calling sequence that initiates the memory allocation request. The information recorded by memory allocation profiling object 408 may be stored in a format suitable for use with a post-processing object (not indicated) that can present the information recorded by profiling object 408 in a graphic format such as bar charts, pie charts, histograms, and so forth. By monitoring these parameters, the memory allocation routine 302 instrumented according to the present invention is suitable for determining application code that is disproportionately generating memory allocation requests in a computer system. The ability to monitor such memory allocation activity in a computer software system in which the application programmer does not have direct control over the memory allocation process beneficially provides insight into the memory performance of the system. If, for example, a particular application program results in a large number of memory allocation requests and the bulk of the allocated memory is essentially unused, it is possible that the memory allocated for these objects will remain in the system memory of a computer system thereby reducing the amount of system memory available for other applications. The lack of available system memory may require the application program, or other application programs operating on the computer system, to access mass storage (such as a hard disk) frequently, which would result in reduced performance. Even if a particular application program manages to contain itself within its heap thereby avoiding frequent accesses to mass storage, the memory management performed by JVM 200 may result in excessive memory garbage collection, in which previously allocated memory space is reclaimed, that can significantly affect system performance.

As indicated previously, the sampling basis for memory allocation routine 302 to monitor memory allocations is the number of allocations (i.e., a memory allocation routine 302 monitors every $X^{th}$ memory allocation) or the number of bytes allocated depending upon the exact interest of the study. In the preferred embodiment, a facility including a graphical user interface is provided to select the sampling basis. The software necessary to instrument the identification of a particular code location and call sequence may be suitably modeled after analogous code used in existing execution profiling tools. In addition, existing execution profile post-processors may be adapted or used directly to assist in interpreting the output of the memory allocation routine profiling information. Because the primary intent of the system configured according to the present invention is to find "hot spots" in memory allocation, the depicted embodiment of memory allocation routine 302 is designed to be concerned only with memory allocation rather than memory leaks caused by a lack of memory "frees". This aspect of memory allocation routines 302 is significant in Java environments, which do not have the traditional concept of an explicit free for each allocated object.

It will be apparent to those skilled in the art having the benefit of this disclosure that the present invention contemplates the profiling of memory allocation events in a data processing system to facilitate improved memory performance. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing a computer program, comprising:
   establishing a memory allocation sampling criterion that evaluates a memory allocation request based on the cumulative size of memory allocated since a previous profiling event occurred;
   responsive to detecting a memory allocation request, determining if the detected memory allocation request satisfies the established sampling criterion;
   only if the detected memory allocation request satisfies the sampling criterion, profiling the memory allocation request to determine a prescribed set of characteristics associated with request; and
   recording the determined characteristics for subsequent review.

2. The method of claim 1, wherein the allocation criteria further includes a sampling criterion that evaluates the memory allocation request based on the amount of memory requested by the memory allocation request.

3. The method of claim 1, wherein the allocation criteria further includes a sampling criterion that evaluates the memory allocation request based on the number of memory allocation requests issued since a previous profiling event occurred.

4. The method of claim 1, wherein the set of profiled characteristics includes the calling sequence that resulted in the memory allocation request.

5. The method of claim 1, wherein the memory allocation request is initiated by an application program written in the Java programming language and the memory allocation request is handled by a Java Virtual Machine.

6. A computer program product comprising a set of instructions on a computer readable media executable by a data processing system and suitable for profiling memory allocation requests, the set of recorded instructions comprising:
   sampling means for determining if a memory allocation request satisfies a profiling criterion wherein the profiling criterion selects memory allocation requests based on the cumulative size of memory requested since a prior profiling event;
   profiling means, responsive to determining that the memory allocation request fulfills the profiling criterion, for determining a set of characteristics associated with the memory allocation request; and
   means for storing the profiled set of characteristics for subsequent review.

7. The computer program product of claim 6, wherein the profiling means includes means for determining the process initiating the memory allocation request.

8. The computer program product of claim 7, wherein the profiling means includes means for determining the thread initiating the memory allocation request.

9. The computer program product of claim 6, wherein the profiling means includes means for determining the calling sequence resulting in the memory allocation request.

10. The computer program product of claim 6, wherein the profiling means are included in a memory allocation routine within a Java Virtual Machine.

11. The computer program product of claim 6, wherein the computer readable media is one of a system memory, a hard disk, a floppy disk, a CD ROM, or a computer tape.

12. A data processing system including processor, memory, input means, and display means, the memory configured with a set of instructions executable by the processor for profiling memory allocation requests, the set of instruction comprising:

sampling means for determining if a memory allocation request satisfies a profiling criterion wherein the memory allocation request is evaluated based on the cumulative size of memory requested since a previous profiling event;

profiling means, responsive to determining that the memory allocation request fulfills the profiling criterion, for determining a set of characteristics associated with the memory allocation request; and means for storing the profiled set of characteristics for subsequent review.

13. The data processing system of claim 12, wherein the profiling criteria further includes a profiling criterion comprising means for counting the number of memory allocation requests since a preceding memory allocation request was profiled and profiling the current memory allocation requests if the number exceeds a specified threshold.

14. The data processing system of claim 12, wherein the profiling criteria further includes a profiling sing means for determining the size of memory requested in the memory allocation request and profiling the memory request if the size exceeds a specified threshold.

15. The data processing system of claim 12, wherein the profiling means includes means for determining the process and thread initiating the memory allocation request.

16. The data processing system of claim 12, wherein the profiling means includes means for determining the calling sequence resulting in the memory allocation request.

17. The data processing system of claim 12, wherein the profiling means comprises a portion of a memory allocation routine in a Java Virtual Machine.

* * * * *

UNITED STATES PATENT AND TRADEMARK OFFICE
CERTIFICATE OF CORRECTION

PATENT NO. : 6,817,011 B1
DATED : November 9, 2004
INVENTOR(S) : William Robert Reynolds It is certified that error appears in the above-identified patent and that said Letters Patent is hereby corrected as shown below:

Column 10,
Lines 1-5, Claim 14, should read:
The data processing system of claim 12, wherein the profilling criteria further includes a profilling criterion comprising means for determining the size of memory requested in the memory allocation request and profilling the memory request if the size exceeds a specified threshold.

Signed and Sealed this

Third Day of May, 2005

JON W. DUDAS
*Director of the United States Patent and Trademark Office*